United States Patent
Marin-Martinod (10) Patent No.: US 11,618,210 B2
(45) Date of Patent: Apr. 4, 2023

(54) ADDITIVE PRINTING APPARATUS AND METHOD TO CREATE MULTI-MATERIAL OBJECTS

(71) Applicant: TE CONNECTIVITY SERVICES GMBH, Schaffhausen (CH)

(72) Inventor: Thierry Emile Henri Marin-Martinod, Hershey, PA (US)

(73) Assignee: TE Connectivity Solutions GmbH, Schaffhausen (CH)

(*) Notice: Subject to any disclaimer, the term of this patent is extended or adjusted under 35 U.S.C. 154(b) by 0 days.

(21) Appl. No.: 17/154,523

(22) Filed: Jan. 21, 2021

(65) Prior Publication Data

US 2021/0283829 A1    Sep. 16, 2021

Related U.S. Application Data

(60) Provisional application No. 62/988,581, filed on Mar. 12, 2020.

(51) Int. Cl.
| | | |
|---|---|---|
| *B29C 64/124* | (2017.01) | |
| *B29C 64/245* | (2017.01) | |
| *B33Y 10/00* | (2015.01) | |
| *B33Y 30/00* | (2015.01) | |

(52) U.S. Cl.
CPC .......... *B29C 64/124* (2017.08); *B29C 64/245* (2017.08); *B33Y 10/00* (2014.12); *B33Y 30/00* (2014.12)

(58) Field of Classification Search
CPC ... B29C 64/124; B29C 64/129; B29C 64/135; B29C 64/259
See application file for complete search history.

(56) References Cited

U.S. PATENT DOCUMENTS

| 8,801,418 B2 | 8/2014 | El-Siblani et al. |
| 2009/0179355 A1 | 7/2009 | Wicker et al. |
| 2020/0122388 A1* | 4/2020 | Van Esbroeck ....... B29C 64/264 |

FOREIGN PATENT DOCUMENTS

| WO | 2018/226164 A2 | 12/2018 |
| WO | 2019/156638 A1 | 8/2019 |

OTHER PUBLICATIONS

International Search Report, International Application No. PCT/IB2021/051960, International Filing Date, Mar. 9, 2021.

* cited by examiner

*Primary Examiner* — Joseph S Del Sole
*Assistant Examiner* — Jamel M Nelson (57) ABSTRACT

An additive printing apparatus and method for printing an object. The additive printing apparatus includes a print area having a movable build plate and a light projector. The apparatus includes a first movable tray with a first resin and second movable tray with a second resin When the first movable tray is positioned in the print area, the build plate is moved toward the first resin and the light projector is activated to cure a portion of the first resin to form a first layer of the object. When the second movable tray is positioned in the print area, the build plate is moved toward the second resin and the light projector is activated to cure a portion of the second resin to form a second layer of the object.

8 Claims, 7 Drawing Sheets

ADDITIVE PRINTING APPARATUS AND METHOD TO CREATE MULTI-MATERIAL OBJECTS

FIELD OF THE INVENTION

The present invention is directed to an additive printing apparatus and method for use in manufacturing multi-material objects. In particular, the apparatus includes multiple movable trays which have different resins provided therein.

BACKGROUND OF THE INVENTION

The creation of three-dimensional parts in very competitive timeframes by rapid prototyping procedures is known in the art. One such procedure uses stereolithography machines using a photosensitive liquid material which may be cross-linked or polymerized by illumination.

In this process, a vat of liquid polymer is exposed to light from a direct light processing (DLP) projector under safe-light conditions. The DLP projector displays the image of the 3D model onto the liquid polymer. The exposed liquid polymer hardens and the build plate moves up or down and the liquid polymer is once more exposed to light. The layering process is repeated until the solidified 3D model or object is complete.

While this process works well for models or objects made from a single resin or material, the process is not effective for models or objects which are made of two or more resins or materials.

It would, therefore, be beneficial to provide an additive printing apparatus and method for manufacturing multi-material models objects. In particular, it would be beneficial to provide an apparatus which includes multiple movable trays for providing different resins to the printing area of the additive printing apparatus.

SUMMARY OF THE INVENTION

An embodiment is directed to an additive printing apparatus for printing an object. The additive printing apparatus includes a print area having a movable build plate and a light projector. A first movable tray has a first resin provided therein. The first movable tray is movable between a first position, in which the first movable tray is positioned in the print area, and a second position, in which the first movable tray is removed from the print area. A second movable tray has a second resin provided therein. The second movable tray is movable between a first position, in which the second movable tray is positioned in the print area, and a second position, in which the second movable tray is removed from the print area. When the first movable tray is positioned in the print area, the build plate is moved toward the first resin and the light projector is activated to cure a portion of the first resin to form a first layer of the object. When the second movable tray is positioned in the print area, the build plate is moved toward the second resin and the light projector is activated to cure a portion of the second resin to form a second layer of the object.

An embodiment is directed to a method of manufacturing an object using direct light processing technology. The method includes: moving a first tray with a first resin provided therein to a print area of an additive printing apparatus; moving a build plate into the first resin; activating the a light projector to cure a first layer of the first resin; removing the build plate from the first resin; and removing the first tray from the print area. The method also includes: moving a second tray with a second resin provided therein to the print area of the additive printing apparatus; moving the build plate into the second resin; and activating the light projector to cure a second layer of the second resin which is attached to the first layer.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

An additive 3D printing apparatus 10, 100 and process 200, such as direct light processing (DLP) printing technology, as illustrated in the FIGS. 1 through 7, is used to manufacture models or objects (not shown). The models or objects may be any type of part used in various industries, such as, for example, an electrical connector. The apparatus 10 is also shown for illustrative purposes, as the apparatus may have different configurations without departing from the scope of the invention.

Figure 1:
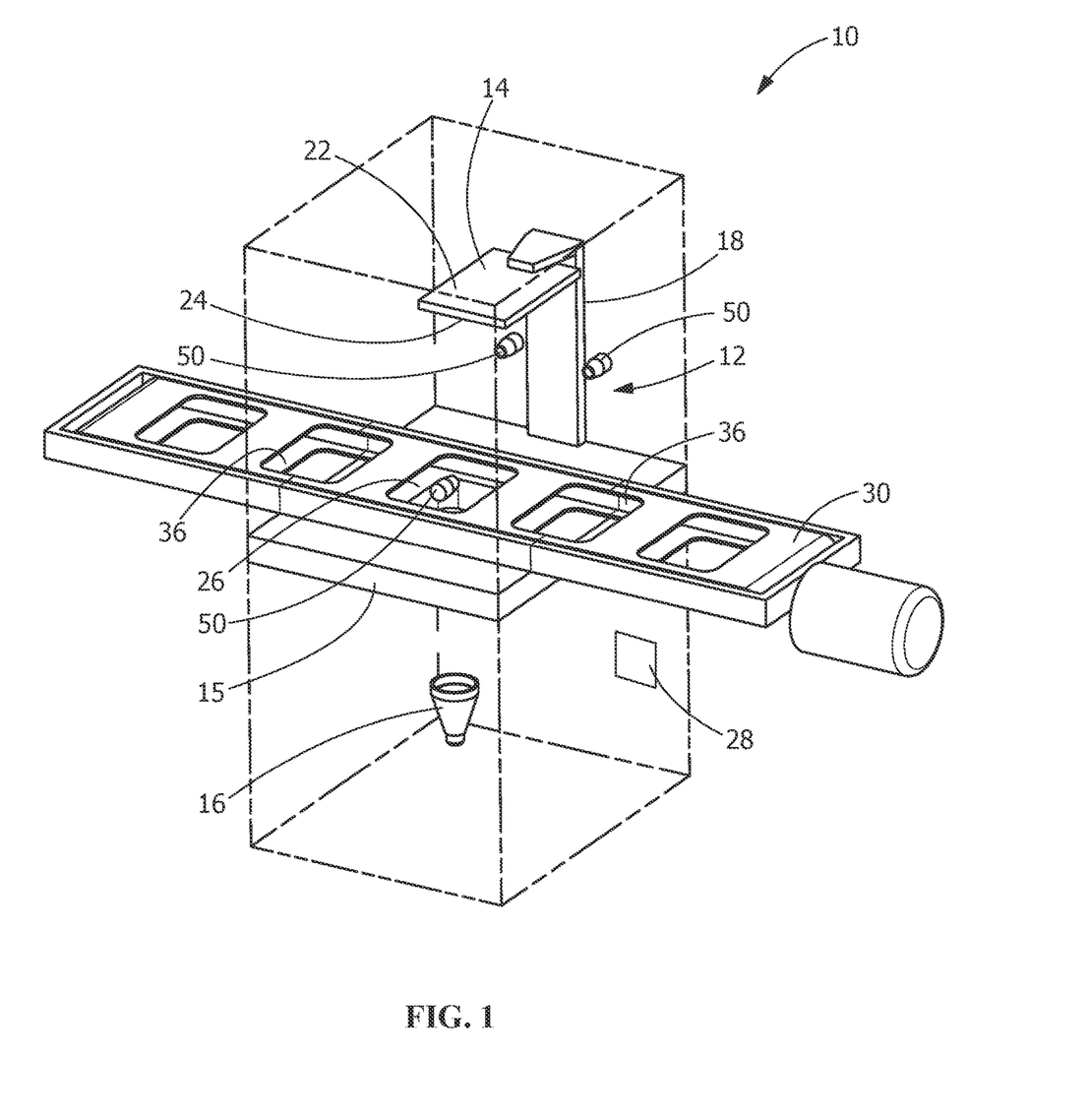
FIG. 1 is diagrammatic perspective view of an illustrative additive printing apparatus with a tray advancement mechanism which is movable in a linear direction relative to a printing area of the additive printing apparatus.
Figure 2:
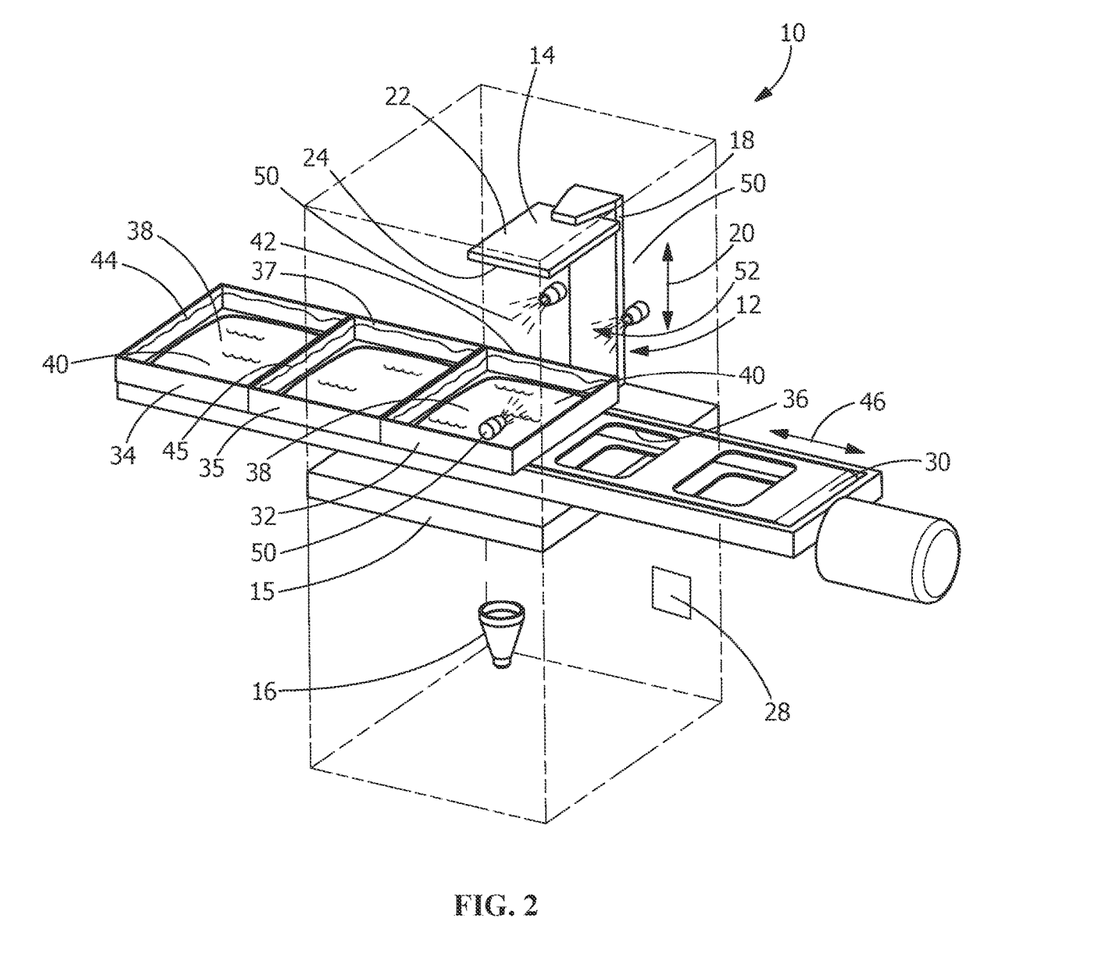
FIG. 2 is diagrammatic perspective view of the additive printing apparatus of FIG. 1, with trays positioned thereon.
Figure 3:
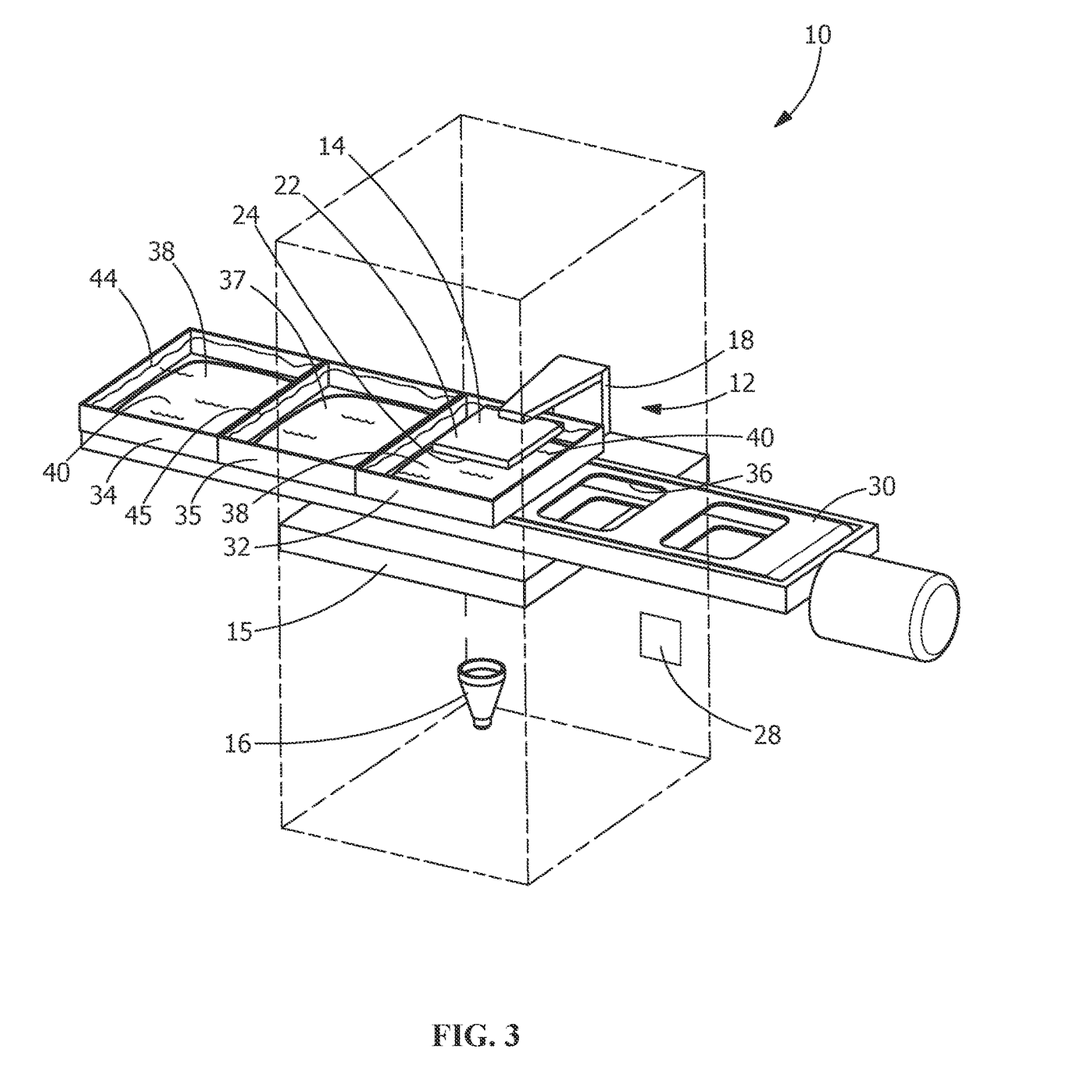
FIG. 3 is diagrammatic perspective view of the additive printing apparatus of FIG. 2, with a build plate positioned in a resin of one of the trays.

Referring to FIGS. 1 through 3, a print area 12 of the printing apparatus 10 is shown. The print area 12 includes a movable build plate 14, a base plate 15 and a light projector 16. Other items such as a coating mechanism or blade (not shown) may be provided in the print area.

The build plate 14 is attached to a movable arm 18. The movable arm 18 and the build plate 14 are movable in a vertical direction, as shown by arrow 20 in FIG. 1. The movable arm 18 and the build plate 14 may be moved by a motor or other known mechanisms without departing from the scope of the invention. The build plate 14 has an upper or first surface 22 and an oppositely facing lower or second surface 24. In the embodiment shown, the movable arm 18 is attached to the upper surface 22 of the build plate 14. However, other configurations may be used.

The base plate 15 extends in a plane which is essentially parallel to a plane of the lower surface 24 of the build plate 14. An opening 26 is provided in the base plate 15. Other configurations of the base plate 15 may be used. In addition, in various embodiments, a base plate 15 may not be provided.

The light projector 16 is provided proximate the build plate 14. In the illustrative embodiment shown, the light projector 16 is a digital light projector which provides light which is projected through the opening 26 of the base plate 15. The light projector 16 projects low intensity light, for example, light of approximately 365 or 405 nanometer wavelength. The light is projected at designated times and for designated durations in individual patterns, as will be more fully described below. The designated times, designated durations and individual patterns are communicated to the light projector 16 by a controller 28 or similar device.

In the embodiment shown in FIGS. 1 through 3, a tray advancement mechanism 30 extends through the print area 12. In the illustrative embodiment shown, a first tray 32, a second tray 34 and a third tray 35 are positioned on the tray advancement mechanism 30. The tray advancement mechanism 30 has openings or surfaces 36 which allow light to pass therethrough. In the embodiment shown, the tray advancement mechanism 30 is a belt, but other mechanisms may be used. The openings or surfaces 36 are positioned in line with the first tray 32 and the second tray 34. Although two trays 32, 34 are shown, other number of trays and corresponding openings or surface 36 may be provided.

The first tray 32 and the second tray 34 have bottom surfaces 38 which allow light to pass therethrough. Material or resin receiving cavities 40 are provided in the first tray 32 and the second tray 34.

A first material or resin 42 is provided in the resin receiving cavity 40 of the first tray 32. A second material or resin 44 is provided in the resin receiving cavity 40 of the second tray 34. In one example, the material 42 in the first tray 32 may be a plastic material and the material 44 in the second tray 34 may be a rubber material. In another example, the material 42 in the first tray 32 may be an insulative material and the material 44 in the second tray 34 may be a conductive material.

The third tray 35 may or may not be positioned in line with the openings or surfaces 36 which allow light to pass therethrough. In the embodiment shown, the third tray 35 is positioned between the first tray 32 and the second tray 34. A cleaning material 45 is provided in the material receiving cavity 37 of the third tray 35.

One or more drying mechanisms 50 may be provided. The drying mechanisms 50 may include, but are not limited to, air jets. In the illustrative embodiment shown, the drying mechanisms 50 are provided proximate to the movable arm 18 and the build plate 14. The drying mechanisms 50 are positioned to be below the build plate 14 when the build plate 14 is the position shown in FIG. 2. In the embodiment shown, three drying mechanisms 50 are shown, however other numbers of drying mechanisms 50 may be provided.

In alternate embodiments one drying mechanism 50 may be provided. In such embodiments, the build plate 14 would be rotatably mounted to the moveable arm 18 to allow all sides of the build plate 14 and the material deposited thereon to be exposed to the drying mechanism 50. Other configurations and types of drying mechanisms 50 may be used without departing from the scope of the invention.

In the embodiment shown in FIGS. 1 through 3, the tray advancement mechanism 30 and the first tray 32, the second tray 34 and the third tray 35 are moved in a linear direction relative to the print are 12, as shown by arrow 46. An electro-mechanical device 48 controls the movement of the tray advancement mechanism 30 and the first tray 32, the second tray 34 and the third tray 35. Alternatively, a pneumatic device or other known device may control the movement of the tray advancement mechanism 30 and the first tray 32 and second tray 34.

Figure 4:
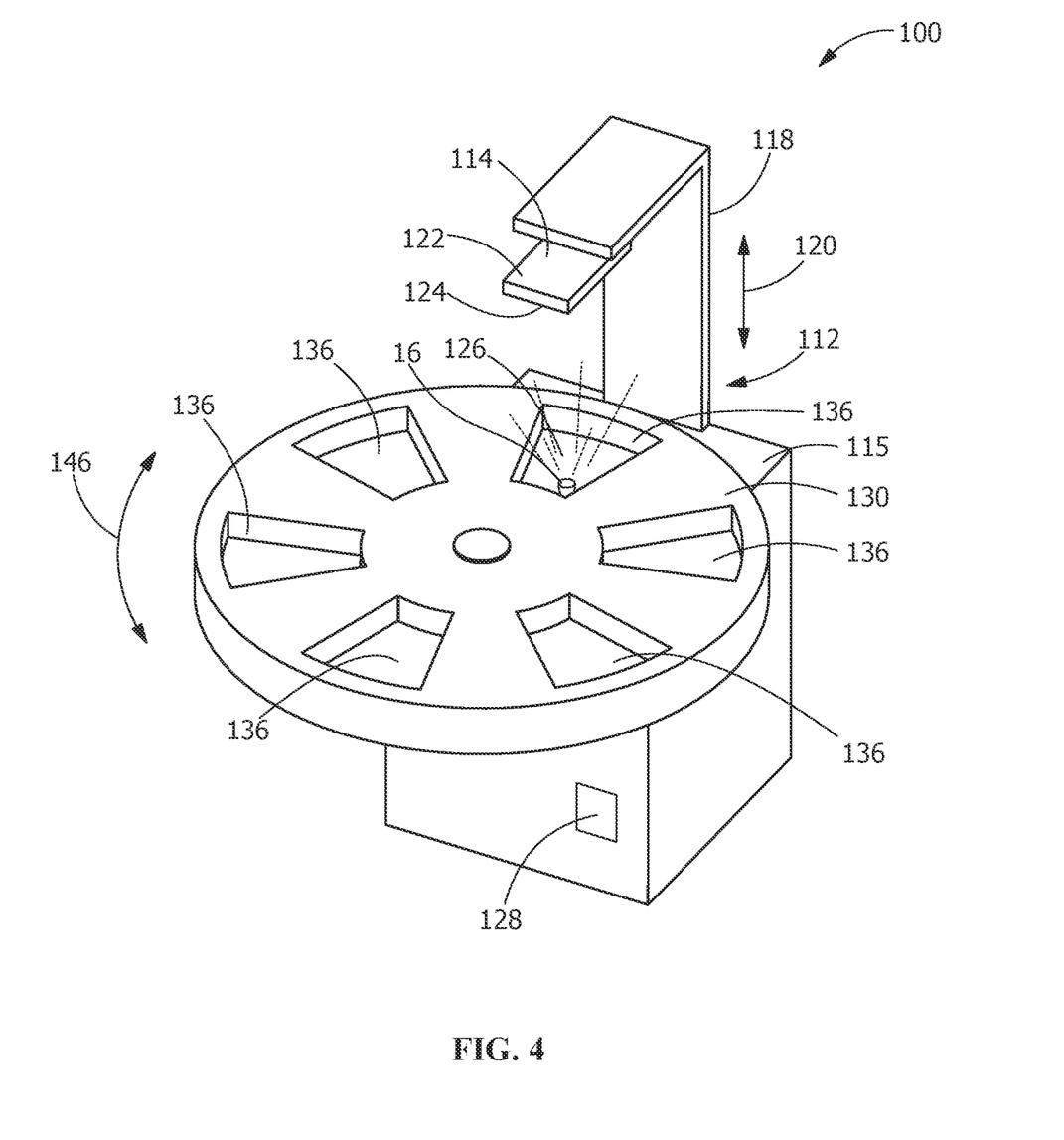
FIG. 4 is diagrammatic perspective view of an illustrative alternate additive printing apparatus with a tray advancement mechanism which is rotatably movable relative to a printing area of the additive printing apparatus.
Figure 5:
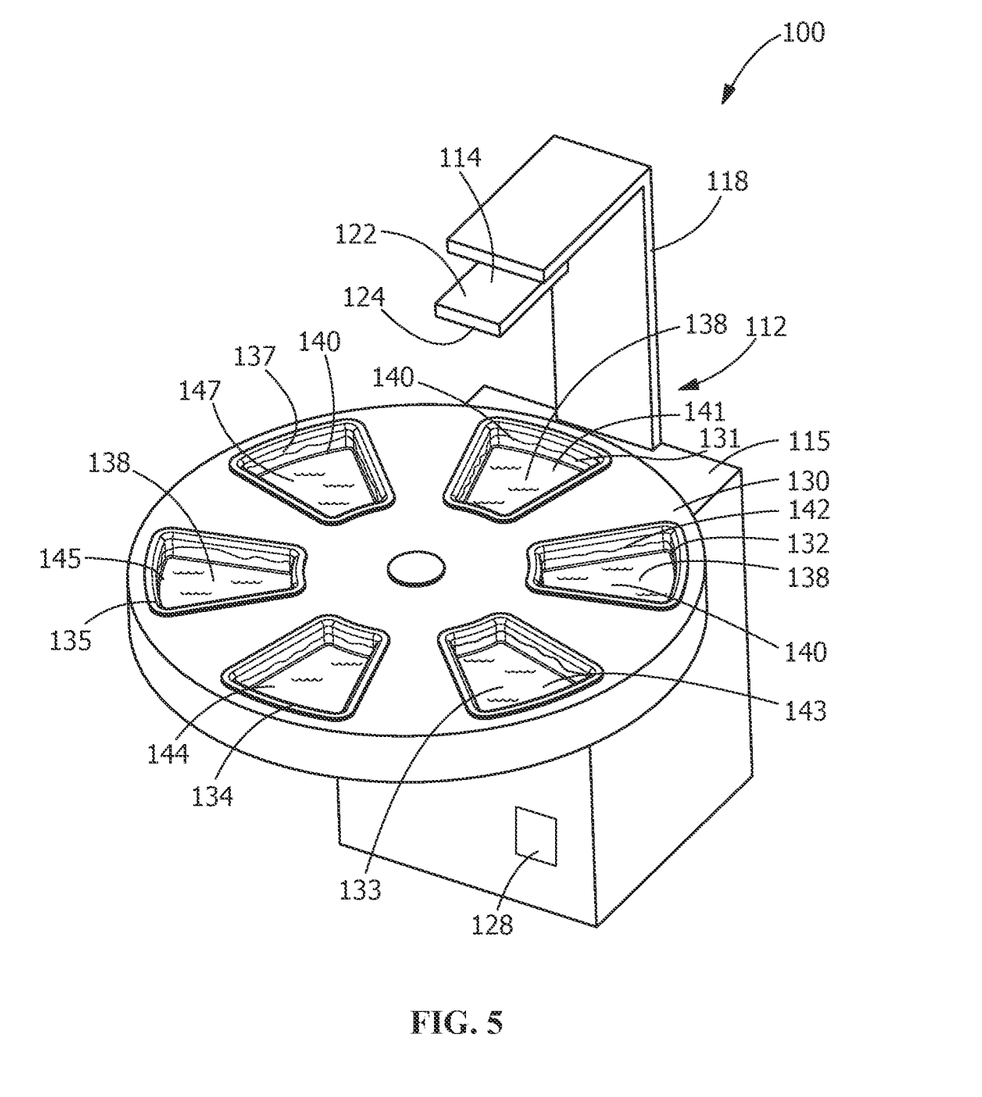
FIG. 5 is diagrammatic perspective view of the additive printing apparatus of FIG. 4, with trays positioned thereon.
Figure 6:
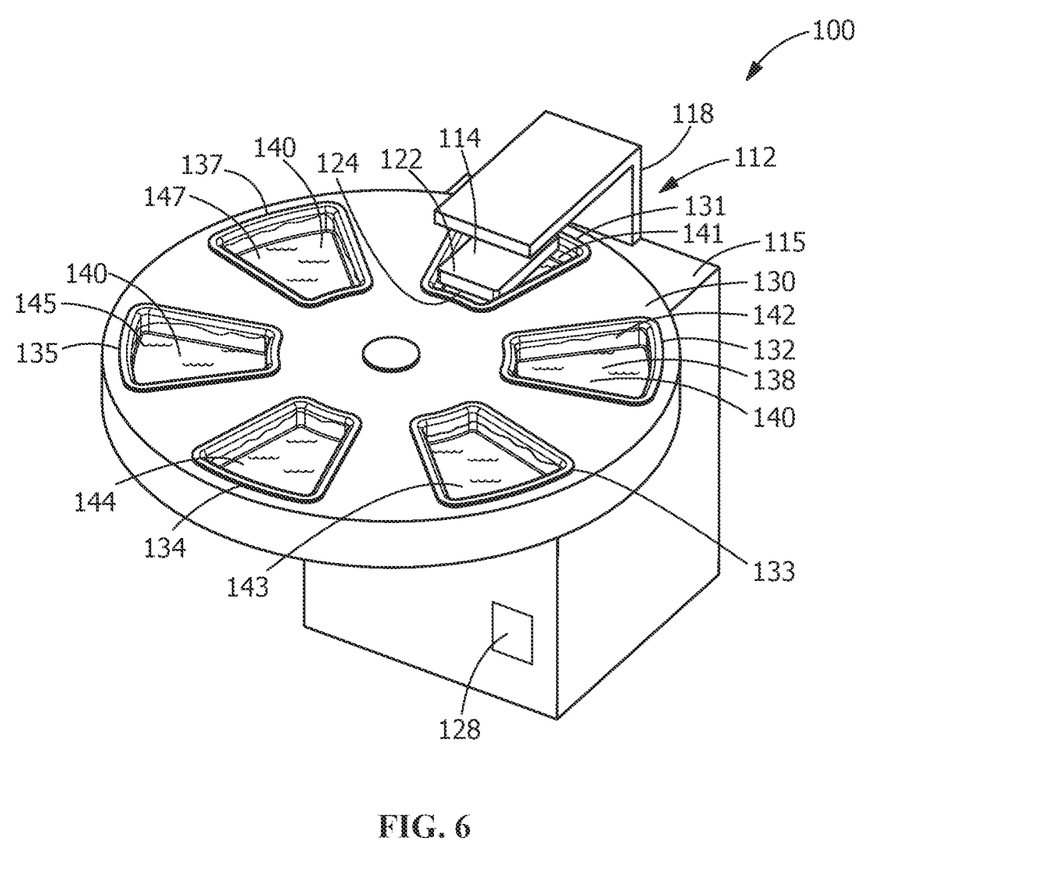
FIG. 6 is diagrammatic perspective view of the additive printing apparatus of FIG. 5, with a build plate positioned in a resin of one of the trays.

Referring to FIGS. 4 through 6, a print area 112 of the printing apparatus 100 is shown. The print area 112 includes a movable build plate 114, a base 115 and a light projector 116. Other items such as a coating mechanism or blade (not shown) may be provided in the print area.

The build plate 114 is attached to a movable arm 118. The movable arm 118 and the build plate 114 are movable in a vertical direction, as shown by arrow 120 in FIG. 4. The movable arm 118 and the build plate 114 may be moved by a motor or other known mechanisms without departing from the scope of the invention. The build plate 114 has an upper or first surface 122 and an oppositely facing lower or second surface 124. In the embodiment shown, the movable arm 118 is attached to the upper surface 122 of the build plate 14. However, other configurations may be used.

The base 115 extends in a plane which is essentially parallel to a plane of the lower surface 124 of the build plate 114. An opening 26 is provided in the base plate 115. Other configurations of the base 115 may be used. In addition, in various embodiments, a base 115 may not be provided.

The light projector 116 is provided proximate the build plate 114. In the illustrative embodiment shown, the light projector 116 is a digital light projector which provides light which is projected through the opening 126 of the base 115. The light projector 116 projects low intensity light, for example, light of approximately 365 or 405 nanometer wavelength. The light is projected at designated times and for designated durations in individual patterns, as will be more fully described below. The designated times, designated durations and individual patterns are communicated to the light projector 116 by a controller 128 or similar device.

In the embodiment shown in FIGS. 4 through 6, a tray advancement mechanism 130 extends through the print area 112. In the illustrative embodiment shown, a first tray 131, a second tray 132, a third tray 133, a fourth tray 134, a fifth tray 135 and a sixth tray 137 are positioned on the tray advancement mechanism 130. The tray advancement mechanism 130 has openings or surfaces 136 which allow light to pass therethrough. The openings or surfaces 136 are positioned in line with the trays 131, 132, 133, 134, 135, 137. Although six trays are shown, other number of trays and corresponding openings or surface 136 may be provided. In addition, cleaning trays (not shown) may be provided proximate to or between on or more of the trays 131, 132, 133, 134, 135, 137.

The trays 131, 132, 133, 134, 135, 137 have bottom surfaces 138 which allow light to pass therethrough. Material or resin receiving cavities 140 are provided in the trays 131, 132, 133, 134, 135, 137. Different materials or resins 141, 142, 143, 144, 145, 147 are provided in the resin receiving cavity 40 of the trays 131, 132, 133, 134, 135, 137. The cleaning trays have one or more cleaning materials (not shown) provided therein.

In the embodiment shown in FIG. 4, the tray advancement mechanism 30 and the trays 131, 132, 133, 134, 135, 137 are moved in a rotational direction relative to the print are 112, as shown by arrow 146. An electro-mechanical device, a pneumatic device or other known devices controls the movement of the tray advancement mechanism 130 and the trays 131, 132, 133, 134, 135, 137.

Figure 7:
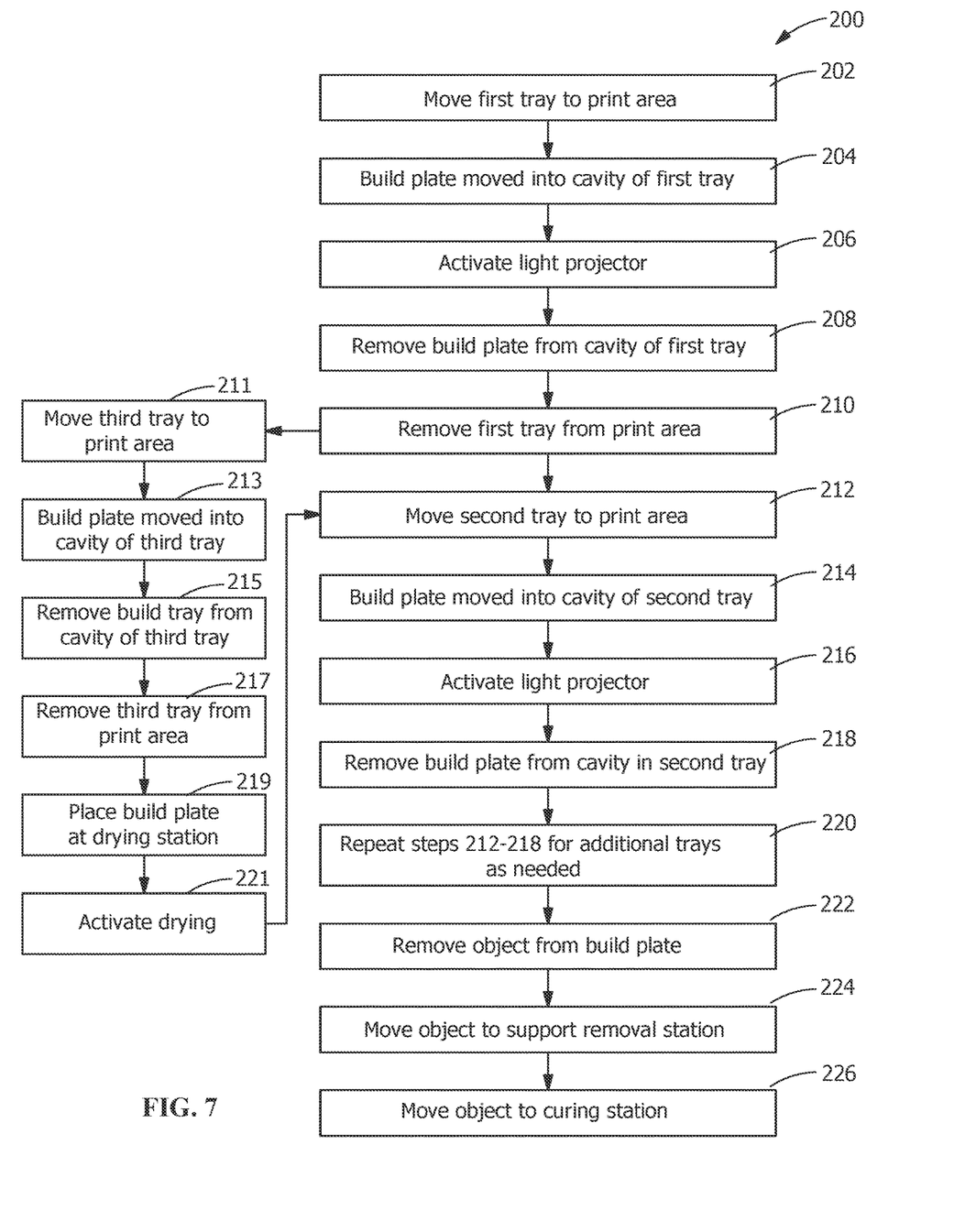
FIG. 7 is a block diagram of an illustrative process of the present invention.

The method 200 of manufacturing an object using direct light processing technology, is illustrated in FIG. 7. Initially, as represented by 202, the first tray 32, 131 with the first resin 42, 141 provided therein is moved to the print area 12, 112 of an additive printing apparatus 10, 110. As represented by 204, the build plate 14, 114 is then moved into the cavity 40, 140 of the first tray 32, 131 wherein the build plate 14, 114 is moved into the first resin 42, 141.

The build plate 12, 112 is positioned in the cavity 40, 140 of the first tray 32, 131 at a height such that the distance between the lower surface 24, 124 of the build plate 12, 112 and the bottom surface 38, 138 of the first tray 32, 131 is equal to the thickness of the next layer of the object. In various illustrative embodiments, the layer may have, for example, a thickness equal to or less than 100 microns, equal to or less than 50 microns (or even thicker), or equal to or less than 25 microns.

With the build plate 14, 114 properly positioned, the light projector 16, 116 is activated to cure a first layer of the first resin 42, 141 onto the build plate 14, 114, as represented by 206. Additional layers of the first resin 42, 141 may also be cured.

As previously stated, the light projector 16, 116 projects low intensity light in individual patterns for each layer provided on the build plate 16, 116 to allow the object to be properly constructed. The light projector 16, 116 applies light in the desired pattern for a defined duration across the layer at the same time to properly cure the resin.

With the first layers properly cured, as represented by 208, the build plate 16, 116 is removed from the first resin 42, 141. The first tray 32, 131 is then removed from the print area 12, 112, as represented by 210.

In various embodiments, the third tray 35 with the cleaning material 45 provided therein is moved to the print area 12, 112 of an additive printing apparatus 10, 110, as represented by 211. As represented by 213, the build plate 14, 114 is then moved into the cavity 40, 140 of the third tray 35 wherein the build plate 14, 114 is moved into the cleaning material 35 to removed unwanted material or contaminants from the layers. With the layers properly cleaned, the build plate 16, 116 is removed from the cleaning material 45, as represented by 215. The third tray 35 is then removed from the print area 12, 112, as represented by 217. In other embodiments, the third tray 35 and cleaning material 45 and the process steps related thereto may not be needed or used.

In various embodiments, the build plate 14 with material deposited thereon is moved to a drying station 52, as represented by 219. In the embodiment shown the drying station is positioned to be below the build plate 14 when the build plate 14 is the position shown in FIG. 2. However, the drying station may be provided in other locations. With the build plate 14 properly positioned in the drying station, the drying mechanisms 50 are activated to dry the material on the build plate 14 to remove any cleaning solution, as represented by 221.

As represented by 212, the second tray 34, 132 with the second resin 44, 142 provided therein is moved to the print area 12, 112 of an additive printing apparatus 10, 110. As represented by 214, the build plate 14, 114 is then moved into the cavity 40, 140 of the second tray 34, 132 wherein the build plate 14, 114 is moved into the second resin 44, 142.

The build plate 12, 112 is positioned in the cavity 40, 140 of the second tray 34, 132 at a height such that the distance between the bottom surface of the previous cured layer or layers positioned on the build plate 12, 112 and the bottom surface 38, 138 of the second tray 34, 132 is equal to the thickness of the next layer of the object.

With the build plate 14, 114 properly positioned, the light projector 16, 116 is activated to cure a second layer of the second resin 44, 142 onto the first layer, as represented by 216. The light projector 16, 116 applies light in the desired pattern for a defined duration across the layer at the same time to properly cure the resin. Additional layers of the second resin 44, 142 may also be cured.

With the second layers properly cured, as represented by 218, the build plate 16, 116 is removed from the second resin 44, 142. The second tray 34, 132 is then removed from the print area 12, 112, as represented by 224.

As represented by 220, this process may be repeated as many times as needed. For example, the first tray 32, 131 may be brought back to the print area 12, 112, or any of the other trays 133, 134, 135, 137 may be brought to the print area 112.

With all of the layers properly applied and cured, the part or object may be removed from the build plate 12, 112, as represented at 222. The part may then be moved to a support removal station, if needed, to remove any excess material or supports from the part, as represented at 224. The support removal treatment of the three-dimensional composite part may be performed by a liquefied neutral or reduction gas system to avoid oxidation.

In order to consolidate the part, the part is subjected to a curing cycle during which the part undergoes a temperature increase at a determined speed up to a temperature known as the curing temperature, at which it remains for a specific time (the curing stage), as represented by 226. The curing allows for the densification of the parts by suppressing the porosity left by the resin once it has been degraded. This densification is accompanied by a modification of the part's dimensions, known as shrinkage, which is controlled by the curing temperature and the duration of the stage. This curing temperature depends on the nature and particle size of the resin or material and the desired final properties. Mechanical strength is directly related to the density of the finished part. The curing temperature and the duration of the stage may be adapted as a function of the strength and/or shrinkage limitations during curing. The curing temperature is always lower than the melting point of the material.

One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An additive printing apparatus for printing an object, the additive printing apparatus comprising:
   - a print area having a movable build plate, a movable arm, a base plate, a tray advancement mechanism and a light projector, the base plate having a base plate opening, the tray advancement mechanism having surfaces which allow light to pass through;
   - a first movable tray having a first resin provided therein, the first movable tray being movable between a first position, in which the first movable tray is positioned in the print area, and a second position, in which the first movable tray is removed from the print area, the first movable tray having a first bottom surface which allows light to pass through;
   - a second movable tray having a second resin provided therein, the second movable tray being movable between a first position, in which the second movable tray is positioned in the print area, and a second position, in which the second movable tray is removed from the print area, the second movable tray having a second bottom surface which allows light to pass through;
   - at least one drying mechanism is provided proximate a movable arm attached to the build plate;
   - wherein when the first movable tray is positioned in the print area, the build plate is moved toward the first resin and the light projector is activated projecting light through the base plate opening, a first respective surface of the surfaces of the tray advancement mechanism and the first bottom surface to cure a portion of the first resin to form a first layer of the object;
   - wherein when the second movable tray is positioned in the print area, the build plate is moved toward the second resin and the light projector is activated projecting light through the base plate opening, a second respective surface of the surfaces of the tray advancement mechanism and the second bottom surface to cure a portion of the second resin to form a second layer of the object.

2. The additive printing apparatus as recited in claim 1, wherein the first tray and the second tray are moved in a linear direction relative to the print area.

3. The additive printing apparatus as recited in claim 2, wherein a third movable tray is provided which has a cleaning material provided therein.

4. The additive printing apparatus as recited in claim 1, wherein the first tray and the second tray are moved in a rotational direction relative to the print area.

5. The additive printing apparatus as recited in claim 4, wherein the first tray and the second tray are two trays of multiple trays.

6. The additive printing apparatus as recited in claim 1, wherein the first resin is an insulative material.

7. The additive printing apparatus as recited in claim 6, wherein the second resin is a conductive material.

8. The additive printing apparatus as recited in claim 1, wherein the movement of the build plate is in a direction which is essentially perpendicular to the movement of the first tray and the second tray.

* * * * *